United States Patent
Le Pennec

(10) Patent No.: US 10,415,739 B2
(45) Date of Patent: Sep. 17, 2019

(54) JOINT ASSEMBLY FOR FORMING A DUCT

(71) Applicant: TOTAL SA, Courbevoie (FR)

(72) Inventor: Serge Le Pennec, Idron (FR)

(73) Assignee: TOTAL SA, Courbevoie (FR)

( * ) Notice: Subject to any disclaimer, the term of this patent is extended or adjusted under 35 U.S.C. 154(b) by 295 days.

(21) Appl. No.: 15/309,389

(22) PCT Filed: May 6, 2015

(86) PCT No.: PCT/EP2015/059955
§ 371 (c)(1),
(2) Date: Nov. 7, 2016

(87) PCT Pub. No.: WO2015/169858
PCT Pub. Date: Nov. 12, 2015

(65) Prior Publication Data
US 2017/0074450 A1    Mar. 16, 2017

(30) Foreign Application Priority Data

May 6, 2014    (EP) .................................. 14305664

(51) Int. Cl.
| F16L 59/18 | (2006.01) |
| E21B 17/042 | (2006.01) |
| F16L 59/21 | (2006.01) |
| E21B 17/00 | (2006.01) |
| F16L 15/08 | (2006.01) |

(52) U.S. Cl.
CPC ............ *F16L 59/18* (2013.01); *E21B 17/003* (2013.01); *E21B 17/042* (2013.01); *F16L 15/08* (2013.01); *F16L 59/21* (2013.01); *F16L 2201/40* (2013.01)

(58) Field of Classification Search
CPC ... F16L 2201/40; F16L 59/166; F16L 59/168; F16L 59/18; F16L 59/181; E21B 17/003
USPC .................................. 285/47, 48, 53, 123.15
See application file for complete search history.

(56) References Cited

U.S. PATENT DOCUMENTS

| 3,015,500 A | * | 1/1962 | Barnett | ................... E21B 17/06 |
| | | | | 285/332.3 |
| 3,574,357 A | * | 4/1971 | Alexandru | .............. E21B 17/04 |
| | | | | 285/123.1 |
| 3,794,358 A | * | 2/1974 | Allen | ...................... E21B 33/10 |
| | | | | 285/123.1 |
| 3,885,595 A | * | 5/1975 | Gibson | ................. F16L 59/188 |
| | | | | 285/47 |

(Continued)

FOREIGN PATENT DOCUMENTS

| FR | 2 673 264 A1 | 8/1992 |
| FR | 2 746 891 A1 | 10/1997 |

(Continued)

OTHER PUBLICATIONS

International Search Report PCT/EP2015/059955, dated Jul. 7, 2015, 3 pages.

*Primary Examiner* — David Bochna
(74) *Attorney, Agent, or Firm* — Patterson Thuente Pedersen, P.A.

(57) ABSTRACT

A duct joint assembly between a first section and a second section, each section consisting of an inner tube and an outer tube, the outer tube surrounding the inner tube, and between which a heat insulator is placed. Each section has a fastening body so that the sections can be assembled to, or disassembled from, each other.

10 Claims, 1 Drawing Sheet

(56) References Cited

U.S. PATENT DOCUMENTS

| | | | | |
|---|---|---|---|---|
| 3,988,029 A * | 10/1976 | Gibson | F16L 39/005 | 285/47 |
| 4,011,732 A * | 3/1977 | Doherty | F16L 39/005 | 285/47 |
| 4,084,842 A * | 4/1978 | Stonitsch | F16L 59/18 | 285/123.17 |
| 4,149,739 A * | 4/1979 | Morris | F16L 7/00 | 285/123.15 |
| 4,340,245 A * | 7/1982 | Stalder | F16L 59/181 | 285/53 |
| 4,415,184 A * | 11/1983 | Stephenson | F16L 59/16 | 285/47 |
| 4,444,420 A * | 4/1984 | McStravick | F16L 59/15 | 285/47 |
| 4,480,371 A * | 11/1984 | McStravick | F16L 59/15 | 285/47 |
| 4,518,175 A * | 5/1985 | Richards | F16L 59/16 | 285/47 |
| 4,538,834 A * | 9/1985 | Brady | F16L 59/166 | 285/47 |
| 4,635,967 A * | 1/1987 | Stephenson | E21B 17/08 | 285/48 |
| 5,447,339 A | 9/1995 | Marchal et al. | | |
| 6,145,547 A | 11/2000 | Villatte | | |
| 6,231,086 B1 * | 5/2001 | Tierling | F16L 15/008 | 285/123.15 |
| 7,207,603 B2 * | 4/2007 | Segreto | F16L 59/18 | 285/123.3 |
| 7,722,088 B2 * | 5/2010 | Pionetti | F16L 9/18 | 285/123.3 |
| 8,061,739 B2 * | 11/2011 | Marchal | F16L 59/182 | 285/123.15 |
| 2002/0089177 A1 | 7/2002 | Bonn | | |
| 2003/0178842 A1 | 9/2003 | Gallagher | | |
| 2004/0245768 A1 | 12/2004 | Giacomelli | | |
| 2009/0096208 A1 | 4/2009 | Marchal | | |
| 2010/0095520 A1 | 4/2010 | Damour et al. | | |
| 2012/0192985 A1 | 8/2012 | Pionetti | | |

FOREIGN PATENT DOCUMENTS

| | | |
|---|---|---|
| FR | 2 921 996 A1 | 4/2009 |
| FR | 2 937 398 A1 | 4/2010 |

\* cited by examiner

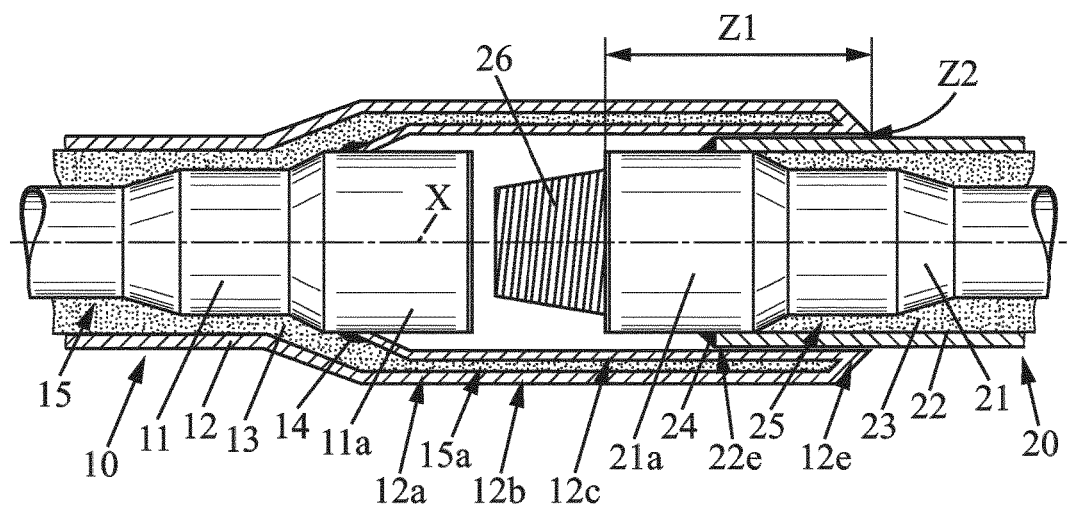

JOINT ASSEMBLY FOR FORMING A DUCT

RELATED APPLICATIONS

The present application is a National Phase entry of PCT Application No. PCT/EP2015/059955 filed May 6, 2015, which claims priority from EP Patent Application No. 14305664.6, filed May 6, 2014, said applications being hereby incorporated by reference herein in their entirety.

FIELD OF THE INVENTION

This invention relates to a joint assembly for forming a duct. In particular, the duct is a duct for transporting a hydrocarbon.

BACKGROUND OF THE INVENTION

The object of the invention is the thermal insulation of a production column in marine applications at great depth. The column (duct) extends substantially vertically between the surface of the sea and a bed located for example 1500 meters under said surface.

The temperature of the sea water at the bed can be very cold, of a few degrees, and for example less than 5° C. The temperature of the sea water at the surface can be between 10° C. and 20° C. The temperature at the bed is very low, and there is a temperature gradient of the sea water between the bed and the surface.

The hydrostatic pressure at the sea bed is very substantial, as it is linked to the substantial depth of the application under consideration which is between 500 meters and 2000 meters, and possibly up to 3000 meters deep.

The temperature of the fluid or hydrocarbon effluent depends on the subsea well. At these substantial hydrostatic pressures, if the temperature of the fluid is lowered under a limit temperature, there is a great risk of provoking the formation of hydrates, or of paraffin. These solid compounds can clog the columns or ducts.

The objective is to reduce as much as possible the variation (reduction) in the temperature of the fluid between its temperature at the sea bed and at the surface in such riser columns or ducts. The applications can be as production of hydrocarbon fluid or a system for recovering hydrocarbon fluid in the case of leaks on such wells at great depths.

In order to retain a substantial temperature of the fluid during its rising, if possible close to the outlet temperature at the sea bed, it is useful to have a thermal insulation for this column.

As such, the formation of hydrates in the column can be prevented. Furthermore, the higher the temperature of the fluid arriving at the surface is, the more transporting it and treating it will be facilitated on the installations at the surface, such as well testing installations. The treatment facility at the surface makes it possible for example to focus on regulating a recovery or confinement system at the sea bed, a system which is delicate to implement, as was shown by the experience with the incident on the "Deepwater Horizon" platform in the Gulf of Mexico.

There are two known solutions for the thermal insulation of a riser column. The production column on wells at great depths can be deployed according to two modes:

with a drilling marine riser, with this riser or tube surrounding the column over the entire height between the surface and the sea bed, it protects the production column from mechanical stresses, or without a drilling marine riser, therefore by using a drilling or production column, directly in the open sea, this solution is referred to as "Open Sea".

In the first case (with a drilling marine riser), there is an annular space between the riser and the column, and the thermal insulation of the production column can be carried out by the following methods:

a) The annular space can be filled with a fluid that can be circulated using a pump and heated using a heat exchanger on the surface;

b) The annular space can be filled with an insulator gel;

c) The production column can be carried out using a tube and the "pipe-in-pipe" technique, with this tube having mechanical characteristics (resistance to compression of the tube load) that cannot be used directly in the depth of the water directly in the open sea;

d) The production column can be provided with electric tracing in order to heat with the Joule effect by passing an electric current in said tracing.

This first solution has the disadvantage of needing to use a device referred to as a blow out preventer (BOP), or at least a device referred to as a lower mariner riser package (LMRP). This equipment is heavy and generates on the fixed installations on the sea bed, substantial mechanical stresses (weight, tension, moment) which leads to over-sizing this equipment.

In the second case (without a drilling marine riser, i.e. using the production column in the open sea), the thermal insulation of the production column can be carried out by a method of setting up a solid outside insulator around the production column.

This solution has the disadvantage of needing to use a column of a specific type, for example having fastening bodies and for example of the "quick union" type. They also have the disadvantage of requiring the use of means of bracing, of lifting and of testing at a pressure suited to these fastening bodies. These means are heavier and more cumbersome and usually are not present on drilling machines. These columns are heavy and their implementation time is long. However, a heavy column does not make it possible to reach great depths, and in particular depths exceeding 1000 meters. Furthermore, in order for such an insulator added to a production column to resist the hydrostatic pressure of the environment at the sea bed, such an insulator is very cumbersome (large diameter around the production column). Furthermore, the production column is then very difficult to disassemble, especially if the insulator is superimposed on the joints between the succession of sections of the column, or then it can be disassembled in a long period of time.

SUMMARY OF THE INVENTION

This invention has for purpose to improve the vertical columns or ducts, in particular to improve the thermal insulation thereof and the facility of assembling them.

More particularly, the invention therefore relates to a joint assembly comprising a first section and a second section for forming a duct that extends in a longitudinal direction, each section comprising at least one inner tube and one outer tube, the outer tube surrounding the inner tube, and between which a heat insulator is placed, each section comprising a fastening body suited so that the sections can be assembled to, or disassembled from, each other, and wherein the inner tubes and the fastening bodies of each section are able to resist the mechanical stresses of a duct that extends directly in the open sea between the surface and the sea bed.

Thanks to the arrangements of such an assembly, a duct or column for hydrocarbon production can be assembled quickly while still having very good thermal insulation.

In various embodiments of the assembly according to the invention, it is possible to have recourse furthermore to one or the other of the following arrangements.

According to an aspect of the invention, the mechanical stresses are at least pressure stresses in the open sea, weight stresses of the assembly and deflection stresses due to dynamic stresses in the open sea.

According to an aspect of the invention, the mechanical stresses correspond to a duct that extends to a depth of at least 1500 meters under the surface, and preferably to 3000 meters.

According to an aspect of the invention, the inner tubes are carried out with a material with a high yield strength.

According to an aspect of the invention, the outer tubes are welded on the inner tubes of each respective section.

According to an aspect of the invention, the first section has a female shape end with an extension in the longitudinal direction, said extension having an outer diameter greater than a portion preceding said extension, and an inner diameter greater than an outer diameter of the second section in order to connect said first and second sections.

According to an aspect of the invention, the inner tube of the first section comprises at its end a radial protrusion adapted to incorporate its fastening body, and the outer tube of said first section is made integral with the inner tube of the first section on said radial protrusion.

According to an aspect of the invention, the inner tube of the second section comprises at its end a radial protrusion adapted to incorporate son fastening body, and the outer tube of said second section has a cylindrical shape with a diameter identical to said radial protrusion in order to fasten each one to the other on said radial protrusion.

According to an aspect of the invention, the assembly further comprises a means for compensation adapted to tighten a portion of the first section on a portion of the second section, in order to reduce a circulation of fluid in a radial space located between said first and second sections.

According to an aspect of the invention, the means of compensation is chosen from an elastic element, an elastic form of the extension, a ring assembled outside said prolongation.

According to an aspect of the invention, the fastening body of the sections is a screwing body, said screwing body having more preferably a conical shape.

BRIEF DESCRIPTION OF THE DRAWINGS

Other characteristics and advantages of the invention shall appear in the following description of one of its embodiments, given by way of a non-limiting example, with regards to the attached drawings.

In the drawings:

FIG. 1 is a longitudinal cross-section view of two sections across from one another in order to be fastened together and form a continuous duct.

DETAILED DESCRIPTION OF THE DRAWINGS

The object of the invention is a duct formed of successive sections in a longitudinal direction, and used for the transport of a fluid comprising a hydrocarbon. More particularly, the invention relates to a substantially vertical column adapted to be used in a sea environment at great depth, with this duct being of the pipe-in-pipe type. A heat insulator is placed between the two walls.

The inner wall (inner tube) is sized to resist the substantial loads of the tubes in the open sea, i.e. vertical mechanical loads (weight, tension), and very substantial nesting moments, in particular for dynamic stress cycles at sea caused for example by swells and various movements of the sea water, and which can greatly affect the service life. The outer wall resists the outer pressure of the environment, and prevents crushing via collapse of the insulator. As such, at least the inner wall is comprised of a material with a high yield strength.

The insulator is for example an insulator adapted to be in a partial vacuum. As such, the performance of the thermal insulation is increased. This insulator is for example with a base of reflective (multi-layer) sheets or a porous material or a cellular material or glass beads. The insulator is for example made of plastic, or polyurethane, or polypropylene or a foam of one of these materials. This insulator is for example an insulator known under the name of "Izoflex®" from the company ITP. The material of the insulator a for example a heat transfer coefficient less than 1 W·m-2·K−1, and preferably less than 0.1 W·m-2·K−1.

The duct can as such be used directly in the open sea, without a drilling marine riser, and therefore very quickly. This duct has very good passive thermal insulation. As such, no means of auxiliary electrical power is required to heat it by the Joule effect.

The duct comprises sections with a substantially general tubular shape. Each section 10, 20 is assembled to another, is or is not of the same type in order to form the marine riser duct; with this duct being adapted to be used in a marine environment at great depths. These ducts are for example referred to in the technical field as "workover riser" (WOR). Each section 10, 20 is of the pipe-in-pipe type.

Each section is for example screwed to the following one, which allows for a fast assembly of the duct. The duct can be disassembled and can be stored at the installation on the surface.

Each section has for example a length substantially of 13 meters.

This duct constituted of pipe-in-pipe sections allows for the use of existing means for handling, lifting, bracing, screwing and tightening of the drilling installations. It allows for the storage of the sections vertically or for the vertical racking of groups of connected sections for example groups of 3 connected sections, therefore of 36 meters in length).

Such a duct and such sections can be used for columns for the production of hydrocarbon fluid for wells at great depths, or for columns for recovering hydrocarbon fluid from a subsea well or from equipment at great depth that is leaking.

This can also be used for the starting of wells. Indeed, at initial completion, wells are evaluated by clean-up procedures and well tests by means of testing placed on the drilling installations on the surface of the sea. These procedures have sequences that have durations that are sometimes long, even on wells with a high potential for hydrocarbons. Indeed, the architecture of the well before production can be cold (colder than during the production of hydrocarbons), and the temperature gradient of the production column does not facilitate the execution of these sequences which can last from several hours to several days. Using production ducts with high thermal insulation can make it possible to save time and therefore a lot of money. More particularly, the invention relates to the joint between two consecutive sections, and the insulation of this joint, such as shown in FIG.

1. In this FIGURE, the section on the left is preferably located underneath and the section on the right is located above in the riser duct towards the surface of the sea.

The duct comprises a first section 10 and a second section 20.

Each section is comprised of an inner tube 11, 21, and of an outer tube 12, 22 surrounding the inner tube. Between the inner and outer tubes is placed a heat insulator 13, 23. The inner tubes 11, 21 of each section each comprise a fastening body. These fastening bodies are for example adapted to be screwed to one another directly or indirectly via an intermediate joint part.

The first section 10 has for example an end with a female shape type, and the second section 20 has an end of the male shape type (or inversely). The second section 20 therefore penetrates into the first section 10 in order to be screwed and made integral (reversibly and therefore able to be disassembled by unscrewing for reuse) with the first section.

The outer tube 22 of the second section 20 is made integral with the inner tube 21 on a radial protrusion 21a of the inner tube, said radial protrusion incorporating a threaded zone 26. This fastening can be carried out by a welding 24. As such, the outer tube 22 is of a substantially cylindrical shape at this end, which simplifies the carrying out thereof. In addition, the weld 24 is carried out over a portion of the inner tube 21 with a material with a large section, which allows for a reliable weld, without the risk of weakening or the risk of cracking.

An inner space 25 located between the outer tube 22 and the inner tube 21 is then filled with a heat insulator material 23. This inner space 25 is sealed completely from the outside environment, for example by the preceding weld 24, which makes it possible to prevent thermal leaks via aspiration of a cold fluid in the inner space 25.

Furthermore, the two tubes (inner and outer) 21, 22 of the second section 20 can transmit a screwing torque of the second section on the first section 10.

The outer tube 12 of the first section 10 is made integral with the inner tube 11 on a radial protrusion 11a at the end of the inner tube 11, with said radial protrusion 11a incorporating a threaded zone (not shown) that is complementary with the preceding threaded zone 26, and located in the last axial portion of said inner tube in the direction of the second section. This fastening can be carried out by a weld 14. As for the weld 14, this weld 14 is carried out on a portion of the inner tube 11 with a material with a large section, which allows for a reliable weld, without the risk of weakening or the risk of cracking.

The outer tube 12 is extended well in front of the radial protrusion 11a of the inner tube and returns to the rear towards this radial protrusion 11a. This portion of the outer tube that makes a U-turn shall be referred to as the extension 12a. The outer tube 12 delimits in this extension 12a (U-turn) an inner space 15 filled with a heat insulator material 13. It is made entirely sealed from the outside environment, for example by the preceding weld 14, which makes it possible to prevent thermal leaks via aspiration of a cold fluid in the inner space 15.

Furthermore, the two tubes (inner and outer) 11, 12 of the first section 10 can transmit a screwing torque of the second section 20 on the first section 10.

Note that the first section 10 comprises at an end opposite that shown (in the longitudinal direction), said opposite end preferably comprising forms and arrangements such as shown here for the second section 20. This is reciprocally the case for the second section 20. As such, the inner space 15, 25 is perfectly sealed and the ends of each section are able to be screwed onto a following section. In particular, the two tubes (inner and outer) 11, 12 of the first section 10 can still transmit a screwing torque of the second section 20 on the first section 10.

As such, thanks to the welds 14, 24, the annular space between the inner and outer tubes (filled by an insulator), is sealed, which suppresses any possible circulation of cold fluid (sea water) and any "chimney effect" (or aspiration) of water into the vertical duct between the sea bed that has cold water and the surface that has hot water.

Furthermore, note that the inner tubes 11, 21 are made from high strength steel for reasons of the mechanical stresses of these tubes assembled vertically in the open sea (in particular, the weight stress of all of the assembled sections). As such, those skilled in the art will not have previously carried out such welds for fear of deteriorating the characteristics and metallurgical qualities that are indispensable for the service life of these highly stressed tubes.

The extension 12a of the outer tube 12 as such comprises:
- a first outer portion 12b, substantially cylindrical with a diameter greater than the diameter of the outer tube 12 upstream of this extension, and which extends to a front end 12e, and
- a second inner portion 12c, substantially cylindrical which returns from the end 12e to the weld 14 on the radial protrusion 11a, said second portion 12c having a diameter less than the diameter of the first portion 12b in order to delimit a space of extension 15a in the extension of the inner space 15. The space of extension 15a is also filled with the heat insulator material 13.

The diameter of the second portion 12b is greater than the diameter of the outer tube 22 (and of the second section 20 in general), in such a way that when the second section 20 is entirely inserted into the first section 10, the space of extension 15a is superimposed radially to the inner space 25 over at least one zone Z1 in the longitudinal direction of the duct.

Consequently, on this zone Z1 the insulator 13 of the first section 10 is superimposed radially to the insulator 23 of the second section 20. The thermal insulation is as such continuous (no interruption in the insulation in the longitudinal and radial directions).

Furthermore, thanks to the geometry defined hereinabove, the joint and in particular the second section 20 is simple to carry out. The duct formed by these sections has a reduced radial encumbrance while still providing a thermal insulation continuity and a high-performance seal.

Advantageously, this zone Z1 has a length in the longitudinal direction of the duct that is greater than 50 centimeters and preferably greater than 1 meter. The improvement in the thermal insulation of these joint zones between sections is very substantial for the thermal efficiency of the complete column (duct).

Furthermore, a pipe-in-pipe system normally very notably increases the outer diameter and the weight of the whole of a column, in such a way that the inner tube has to be even more resistant to the mechanical stresses. According to this invention, the geometry of the sections in the joint zone and the use of welds to form said pipe-in-pipe assembly makes it possible to limit this increase in weight, thanks to which the column formed can reach greater depths, in particular greater than 1500 meters.

Between the outer tube 22 of the second section 20 and the second portion 12b of the first section 10, there is a space Z2. This space Z2 is required for the assembling of the sections, but it can be greatly reduced or cancelled by various means of compensation. As such, the circulation of cold fluid (sea water) in this space Z2 can be limited and reduced, and the corresponding thermal losses are also reduced.

According to a first alternative, this space Z2 comprises an elastic sealing element, for example of the "wiper joint" type. This joint can allow for a compensation in pressure while still limiting the circulation of fluid.

According to a second alternative, the extension 12a comprises shapes that are adapted so that said extension 12a is itself radially elastic and so that it comes into contact radially on the outer cylindrical portion of the second section 20.

According to a third alternative, the first section 10 comprises a ring (for example elastic or for screwing) assembled outside the end of the extension 12a in order to tighten it radially on the second section 20. In this way, the space Z2 is made low or even zero in such a way as to increase the seal of the joint between the two sections 10, 20. The thermal insulation performance of the joint of the two sections and the sealing performance of this joint are as such improved.

It is understood that the outer tube 12 and in particular the extension 12a can be carried out by welding of several elements (for example at least the first portion 12b and the second portion 12c).

The threaded zones of the first and second sections 10, 20 are for example of the conical type, and advantageously have shapes and bodies that are adapted to improve the seal and the resistance of the fastening of the sections together.

Thanks to the arrangements of the sections described hereinabove, a vertical production duct is carried out that is able to be assembled and disassembled quickly with conventional tools and which simultaneously has the characteristics of mechanical resistance of a work over riser and greatly improved thermal characteristics. The thermal losses at the joints are greatly reduced or cancelled. The formation of hydrate in this duct used for applications at great sea depths is as such prevented.

Thanks to the shapes of the ends of the sections, and in particular thanks to the radial protrusion of the inner tubes, the mechanical connection between each section is mechanically very resistant, and is able to resist the stresses of traction, tension, weight and moment.

Thanks to the sections according to the invention, the latter are lighter than the current solutions with an equivalent thermal insulation, the mechanical stresses are as such reduced and the sections make it possible to reach much greater depths.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A joint assembly comprising a first section and a second section for forming a duct that extends in a longitudinal direction, each section comprising at least one inner tube and one outer tube, the outer tube surrounding the inner tube, and between which a heat insulator is disposed, each section comprising a fastening body adapted so that the sections can be assembled to, or disassembled from, each other, and wherein the inner tubes and the fastening bodies of each section are able to resist mechanical stresses of a duct that extends directly in the open sea between the surface and the sea bed;

and wherein the first section has a female shape end with an extension in the longitudinal direction, said extension having an outer diameter greater than a portion preceding said extension, and an inner diameter greater than an outer diameter of the second section in order to connect said first and second sections; and the extension of the first section further comprises a first outer portion having a substantially cylindrical shape and which terminates at a front end, and a second inner portion, substantially cylindrical, which returns from the front end to a connecting point on a radial protrusion of the inner tube, said second inner portion and first outer portion further defining an extension space, said extension space filled with the heat insulator.

2. The assembly according to claim 1, wherein the mechanical stresses are at least pressure stresses in the open sea, weight stresses for the whole and deflection stresses due to the dynamic stresses in the open sea.

3. The assembly according to claim 1, wherein the mechanical stresses correspond to a duct that extends to a depth of at least 1500 meters under the surface.

4. The assembly according to claim 1, wherein the inner tubes are carried out with a material with high yield strength.

5. The assembly according to claim 1, wherein the outer tubes are welded on the inner tubes of each respective section.

6. The assembly according to claim 1, wherein the inner tube of the first section comprises at its end a radial protrusion adapted to incorporate its fastening body, and the outer tube of said first section is made integral with the inner tube of the first section on said radial protrusion.

7. The assembly according to claim 1, wherein the inner tube of the second section comprises at its end a radial protrusion adapted to incorporate its fastening body, and the outer tube of said second section has a cylindrical shape with a diameter identical to said radial protrusion in order to fasten them to one another on said radial protrusion.

8. The assembly according to claim 1, wherein a space is defined between the outer tube of the second section and the second inner portion of the first section; said space required for assembly of the sections in order to reduce a circulation of fluid in a radial space located between said first and second sections.

9. The assembly according to claim 8, wherein the space is filled by an elastic element, an elastic form of the extension, or a ring assembled outside said extension.

10. The assembly according to claim 1, wherein the fastening body of the sections is a screwing body, said screwing body having a conical shape.

* * * * *